(12) United States Patent
Swint et al.

(10) Patent No.: US 11,636,117 B2
(45) Date of Patent: Apr. 25, 2023

(54) CONTENT SELECTION USING PSYCHOLOGICAL FACTOR VECTORS

(71) Applicant: Dallas Limetree, LLC, Dallas, TX (US)

(72) Inventors: Galen S. Swint, Dallas, TX (US); Thomas Rouse, Dallas, TX (US); Michael T. Meadows, Dallas, TX (US)

(73) Assignee: DALLAS LIMETREE, LLC, Dallas, TX (US)

( * ) Notice: Subject to any disclaimer, the term of this patent is extended or adjusted under 35 U.S.C. 154(b) by 0 days.

(21) Appl. No.: 17/465,783

(22) Filed: Sep. 2, 2021

(65) Prior Publication Data

US 2021/0397613 A1 Dec. 23, 2021

Related U.S. Application Data

(63) Continuation-in-part of application No. 16/453,720, filed on Jun. 26, 2019, now Pat. No. 11,170,271.

(51) Int. Cl.
| | |
|---|---|
| *G06V 40/16* | (2022.01) |
| *G06F 16/2457* | (2019.01) |
| *G06F 16/248* | (2019.01) |
| *G06N 3/08* | (2023.01) |

(52) U.S. Cl.
CPC ........ *G06F 16/2457* (2019.01); *G06F 16/248* (2019.01); *G06N 3/08* (2013.01)

(58) Field of Classification Search
CPC combination set(s) only.
See application file for complete search history.

(56) References Cited

U.S. PATENT DOCUMENTS

| | | | |
|---|---|---|---|
| 5,884,626 A * | 3/1999 | Kuroda | A61B 5/0006 600/545 |
| 8,391,611 B2 | 3/2013 | Engtrom et al. | |
| 9,087,297 B1 | 7/2015 | Filippova et al. | |
| 9,355,312 B2 | 5/2016 | Amtrup et al. | |
| 9,465,987 B1 | 10/2016 | Bell et al. | |
| 9,576,196 B1 | 2/2017 | Natarajan | |
| 10,031,977 B1 * | 7/2018 | Maycock | G06F 3/0484 |
| 10,262,239 B2 | 4/2019 | Polak et al. | |
| 10,319,035 B2 | 6/2019 | Nelson et al. | |
| 10,445,580 B2 | 10/2019 | Matsumoto | |
| 11,106,896 B2 * | 8/2021 | Hu | G06V 40/172 |
| 11,320,385 B2 * | 5/2022 | Loken | G01N 21/8851 |
| 2003/0101181 A1 | 5/2003 | Al-Kofahi et al. | |
| 2007/0101269 A1 * | 5/2007 | Hua | H04N 21/44008 348/231.2 |

(Continued)

*Primary Examiner* — Solomon G Bezuayehu
(74) *Attorney, Agent, or Firm* — Ferguson Braswell Fraser Kubasta PC

(57) ABSTRACT

A method implements content selection using psychological factors. A person vector is generated from a record. The person vector identifies a set of data representing a person. A psychological factor vector is generated from a content of a plurality of content. The psychological factor vector identifies a set of psychological factors from the content. The person vector and the psychological factor vector are combined to generate an input vector. An action score is generated from the input vector. The action score identifies a probability of an action on the content by the person. The content is selected from the plurality of content using the action score. The content is presented.

20 Claims, 9 Drawing Sheets

(56) References Cited

U.S. PATENT DOCUMENTS

| | | |
|---|---|---|
| 2008/0123907 A1 | 5/2008 | Eura et al. |
| 2010/0060736 A1 | 3/2010 | Shi et al. |
| 2012/0101966 A1* | 4/2012 | van Coppenolle ..... H04L 12/00 706/20 |
| 2012/0269441 A1 | 10/2012 | Marchesotti et al. |
| 2013/0129307 A1 | 5/2013 | Choe et al. |
| 2013/0259390 A1 | 10/2013 | Dunlop et al. |
| 2014/0129989 A1* | 5/2014 | Kim ..................... G06F 3/0482 715/838 |
| 2014/0223462 A1* | 8/2014 | Aimone ................ G16H 40/67 725/10 |
| 2015/0074020 A1* | 3/2015 | Arpat .................... G06N 20/00 706/12 |
| 2016/0004911 A1 | 1/2016 | Cheng et al. |
| 2016/0148077 A1* | 5/2016 | Cox ................... G06F 18/2413 382/159 |
| 2016/0225044 A1* | 8/2016 | Lawson ................ H04L 41/147 |
| 2017/0295404 A1 | 10/2017 | Meredith et al. |
| 2018/0150572 A1* | 5/2018 | Yates .................... G06Q 50/01 |
| 2018/0336490 A1* | 11/2018 | Gao ...................... G06N 20/00 |
| 2019/0095961 A1* | 3/2019 | Wu ..................... G06Q 30/0255 |
| 2019/0124023 A1* | 4/2019 | Conroy ................ G06F 16/9535 |
| 2019/0208279 A1* | 7/2019 | Anker ................... H04N 21/482 |
| 2019/0266617 A1* | 8/2019 | Hwang .................. G06Q 50/01 |
| 2019/0325203 A1* | 10/2019 | Yao ....................... G06V 40/174 |
| 2019/0370854 A1* | 12/2019 | Gao ....................... H04L 67/535 |
| 2019/0379938 A1* | 12/2019 | Salo ..................... H04N 21/252 |
| 2019/0382026 A1* | 12/2019 | Mochizuki ........... B60H 3/0035 |
| 2020/0005354 A1* | 1/2020 | Gupta ...................... G06N 7/01 |
| 2020/0020447 A1* | 1/2020 | Generoso ............... G16H 50/70 |
| 2020/0082850 A1 | 3/2020 | He et al. |
| 2020/0090656 A1 | 3/2020 | Wantland et al. |
| 2020/0137463 A1 | 4/2020 | Kumar et al. |
| 2020/0211052 A1* | 7/2020 | Tasharofi ............... G06N 20/00 |
| 2020/0296480 A1* | 9/2020 | Chappell, III ...... H04N 21/8545 |
| 2020/0301973 A1* | 9/2020 | Sewani ................ G06F 16/9035 |
| 2020/0302236 A1* | 9/2020 | Gao ..................... G06F 18/2155 |
| 2020/0320112 A1* | 10/2020 | Bansal ................ G06F 16/5866 |
| 2021/0004572 A1* | 1/2021 | Hu ....................... G06V 10/764 |
| 2021/0136537 A1* | 5/2021 | Zaltzman ............... G06Q 50/14 |
| 2021/0361217 A1* | 11/2021 | Attia ..................... A61B 5/366 |

\* cited by examiner

CONTENT SELECTION USING PSYCHOLOGICAL FACTOR VECTORS

CROSS-REFERENCE TO RELATED APPLICATIONS

This application is a continuation in part of U.S. patent application Ser. No. 16/453,720, filed on Jun. 26, 2019, which is hereby incorporated by reference. To the extent possible, this application claims benefit of the filing date of co-pending U.S. patent application Ser. No. 16/453,720 under 35 U.S.C. § 120. This application is also related to U.S. Pat. No. 10,915,797.

BACKGROUND

Psychological factors, including cognitive biases and heuristics, predictably influence attitudes, decisions and behaviors of people in response to creative content. Creative content (including elements or features in creative: images, video, audio or text) elicits different types of psychological responses, depending on the specific characteristics embedded or encoded within the content. Challenges for computing systems include identifying psychological factors to evoke behavior change and selecting content based on identified psychological factors, including the heuristics and cognitive biases that are meaningful to people.

SUMMARY

In general, in one aspect, one or more embodiments relate to a method implementing psychological factors and cognitive biases content selection. A person vector is generated from a record. The person vector identifies a set of data representing a person. A psychological factor vector is generated from a content of a plurality of content. The psychological factor vector identifies a set of psychological factors from the content. The person vector and the psychological factor vector are combined to generate an input vector. An action score is generated from the input vector. The action score identifies a probability of an action on the content by the person. The content is selected from the plurality of content using the action score. The content is presented.

In general, in one aspect, one or more embodiments relate to a system that includes a server and an application. The server includes one or more processors and one or more memories. The application executes on the server. A person vector is generated from a record. The person vector identifies a set of data representing a person. A psychological factor vector is generated from a content of a plurality of content. The psychological factor vector identifies a set of psychological factors from the content. The person vector and the psychological factor vector are combined to generate an input vector. An action score is generated from the input vector. The action score identifies a probability of an action on the content by the person. The content is selected from the plurality of content using the action score. The content is presented.

In general, in one aspect, one or more embodiments relate to a method of training a machine learning model. A training person vector is generated from a training record. The training person vector identifies a set of data for a person. A training psychological factor vector is generated from training content. The training psychological factor vector identifies a set of psychological factors from the training content. A psychological factor model is updated using the training psychological factor vector and psychological factor feedback to train the psychological factor model. The training person vector and the training psychological factor vector are combined to generate a training input vector. A training action score is generated from the training input vector. The training action score identifies a probability of an action on the training content by the person. The action model is updated using the training action score and action score feedback to train the action model.

Other aspects of the disclosure will be apparent from the following description and the appended claims.

DETAILED DESCRIPTION

Figure 1A:
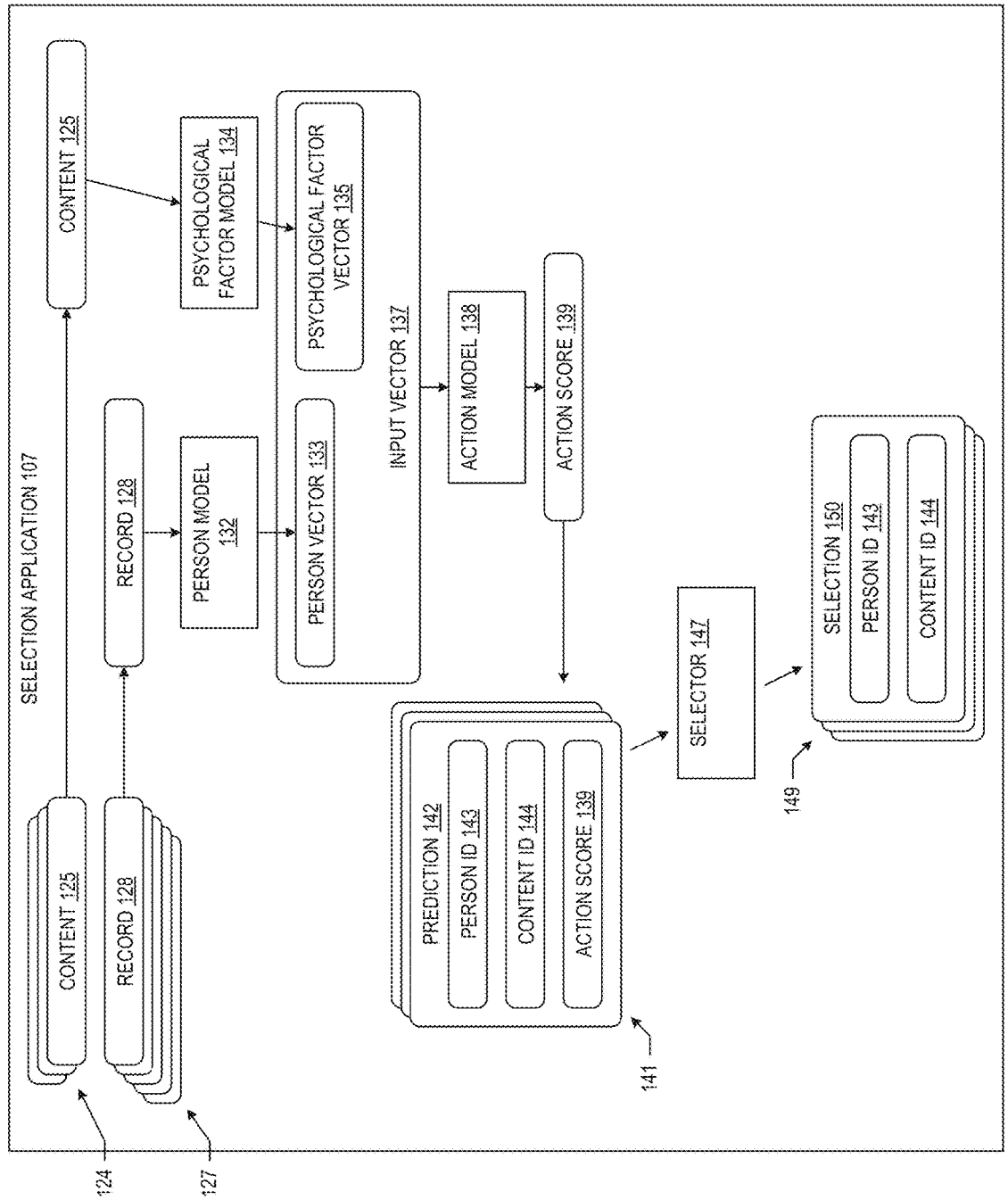
FIG. 1A, FIG. 1B, FIG. 1C, and FIG. 1D show diagrams of systems in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure use machine learning models to identify the psychological factors in content and determine the probability that a person (also referred to as a user) will take action when presented with content based on the psychological factors of the content. The content may include psychological factors (choice architecture, decision heuristics, cognitive and affect biases, framing effects), personal factors (age and life-cycle stage, occupation, economic circumstances, lifestyle, personality and self concept), social factors (reference groups, family, roles and status), cultural factors (culture, subculture, social class system), etc. The system receives content, identifies the psychological factors withing the content, and then selects the content with the highest probability of action by a user.

For example, the content (also referred to as "creative") may include multiple emails that may be sent to a user. The psychological factor model is used to identify the psychological factors in the emails. An action model is used to determine, based on the psychological factors, the email to which a person is most likely to respond. The action model generates an action score from an input vector, which may be generated based on prior emails and the psychological factors of prior emails. The selected email is then presented to the user. Selection of the content by the system based on psychological factors increases interaction by the user with the system.

Types of content may include emails, images, text messages, voice messages, etc. The actions a person may take in response to the content include signing-up for a service, sending an email, visiting a web page, completing a form, sending a text message, calling a phone number, etc. The content may include interaction information that is used by the person to take action on the content that is tracked with the system. For example, the content may include an email address, a website link, a phone number, mailing back a response card, contacting a third party, "liking" a post on a digital social platform, purchasing an item, logging in to a customer portal, completing a questionnaire, etc. If the desired action is for a person to complete an online health assessment questionnaire, for example, the content of the message will be chosen so that the person is most likely to click a link, answer questions, and submit answers to the health assessment questionnaire.

The system trains machine learning models to process and select the content for users. The machine learning models include psychological factor models and action models. The psychological factor models receive content as input and output psychological factor vectors that identify the psychological factors in the content. The action models receive the psychological factor vectors and user information as input and output an action score, which correlates to the probability that a person will act in response to being presented with content. Different psychological factor models may be trained for each type of content. Different action models may be trained for each type of action. Additionally, different content and action models may be used for different types of industries, different products, different offers for the same product, different brands, different customer locales, etc. E.g., a system may be selected to have different models for a regional Medicaid plan in Los Angeles that are distinct from models for a regional plan in San Diego. Likewise, systems may use different models for a single health insurer but different plans for an employer versus for an ACA (Affordable Care Act) exchange plan.

Psychological factors include heuristics, which are mental shortcuts that a person may employ, consciously or unconsciously, that impact judgment and decision-making. Psychological biases and heuristics are numerous and may comprise notions such as "scarcity effect," where a deal or item is limited in supply or time (e.g., "application deadline is in 1 week"), "loss aversion," in which an offer is framed in terms of avoiding potential losses versus acquiring gains (e.g., "you'll regret missing out on this opportunity"), "social norms," in which people desire to follow the behaviors of the majority (e.g., "90% of users choose this option") "confirmation bias" in which a person is looking to re-affirm a prior decision, or the "identifiable victim effect" in which a person feels greater empathy when a specific individual is observed under hardship compared with a larger, vague group.

Psychological factors (including heuristics) are objectively quantified and valued in the content with the machine learning models used by the system. Each of the psychological factors may be identified in content (email, printed images, text messages, voice messages, etc.). A real value from 0 (the psychological factor is not present) to 1 (the psychological factor is strongly present) may be used to identify the presence of the psychological factor in content. The real value may be stored as a floating-point value. A vector (referred to as a psychological factor vector) may be used as a data structure to combine multiple values for multiple psychological factors. For example, a vector may include multiple elements (also referred to as dimensions) with each element having the floating-point value for and representing one of a psychological factor. Different numbers of psychological factors and different types of psychological factors may be used. Multiple psychological factors may be combined into a single targeted psychological factor or heuristic measure. More than one psychological factor may be present in a single creative at any given time.

In one embodiment, the psychological factors identified by the system may include the psychological factors labeled as "social proof", "effort aversion", "anchoring", "expert social proof", "urgency", "urgent social proof", "loss frame", and "concrete benefit". A psychological factor vector for these eight psychological factors would have eight real values. "Urgent social proof" would represent the strength of a combined urgent and social proof message. By way of example, "call by July 16 to claim your pre-approval before it expires" would have a high urgency score, but no social proof. "Join over 5,000 people in Smith county who use our pre-approved car loan" would have social proof but no urgency. "Call this month to join 5,000 people like you claimed a pre-approval" would have both dimensions but with neither urgency nor social proof as strong as the standalone heuristics or psychological factors.

The psychological factor of "social proof" may be used in content to indicate that other people have taken a similar action for a given company to influence the decision of a person. For example, the message of "Over 5,000 people in your town" references the fact that other people, like the prospect, have also chosen Company A and reassures a person that the choice is common and appropriate for the situation. Content with these messages may yield a high value for the element of the psychological factor vector that represents the "social proof" psychological factor.

The psychological factor of "effort aversion" may be used in content to indicate that making a decision or taking action will require a limited expenditure of effort on behalf of the user. Doing so may help overcome procrastination by reassuring the user that taking action requires a minimal time commitment. For example, the message "takes just 2 minutes" or "just three easy steps" may yield a high value for the element of the psychological factor vector that represents "effort aversion."

The psychological factor of "anchoring" may be used in content to establish a reference point for the user (an initial anchor number), which influences the way the user interprets other information to make a decision. For example, when an offer is discounted from $50 to $25, the $50 is the price anchor for the $25 sales price. The initial price anchor makes the $25 price point seem like a good deal from the perspective of the user. Content that includes a numerical reference point (such as a premium price point or an original price point) may yield a high value for the element of the psychological factor vector that represents "anchoring."

The psychological factor of "expert social proof" may be used in content to indicate that experts would approve of the decision of the user. Doing so may allay fears about making a poor decision by reassuring a user that trusted experts recommend a specific choice, or have made similar decisions. For example, the message of "experts agree" may yield a high value for the element of the psychological factor vector that represents the "expert social proof" psychological factor.

The psychological factor of "urgency" may be used in content to urge the user to overcome procrastination and make a decision more quickly. For example, a message that states: "act now", "we have limited supply", "call by July 31", etc., may yield a high value for the element of the psychological factor vector that represents the "urgency" psychological factor.

The psychological factor of "urgent social proof" may be a combination of psychological factors used in content. The psychological factor of "urgent social proof" may be a combination of the psychological factor "other people are doing it", to indicate that other users chose the product a user is considering, with the psychological factor "deadline" to take action quickly. For example, the message of "90% of managers choose their hire from the first 100 applications" references the fact that other applicants, like the prospect is desired to act, have chosen to act quickly under a deadline. Testimonials and ratings from other users attached to a deadline or demanding immediate action may also provide "urgent social proof". Content with these messages may yield a high value for the element of the psychological factor vector that represents the "urgent social proof" psychological factor.

The psychological factor of "loss frame" may be used in content to motivate action by describing an offer or choice in terms of avoiding potential losses versus acquiring gains. For example, the message of "you'll regret losing your extra benefits" may influence a user who is afraid of losing out on benefits to make a decision that leads to the user keeping extra benefits. Content with these messages may yield a high value for the element of the psychological factor vector that represents the "loss frame" psychological factor.

The psychological factor of "concrete benefit" may be used in content to identify a specific (concrete) benefit for a user. A user may understand the impact of their decision more easily when it is described in a highly salient (versus abstract) way to the user. For example, a message that states "save $5,000 with a pre-approved loan and pay for groceries this year" may yield a high value substantially close to 1 for the element of the psychological factor vector that represents the "concrete benefit" psychological factor because it provides the user with a specific (concrete) use case for what the user could do with their savings.

Figure 1B:
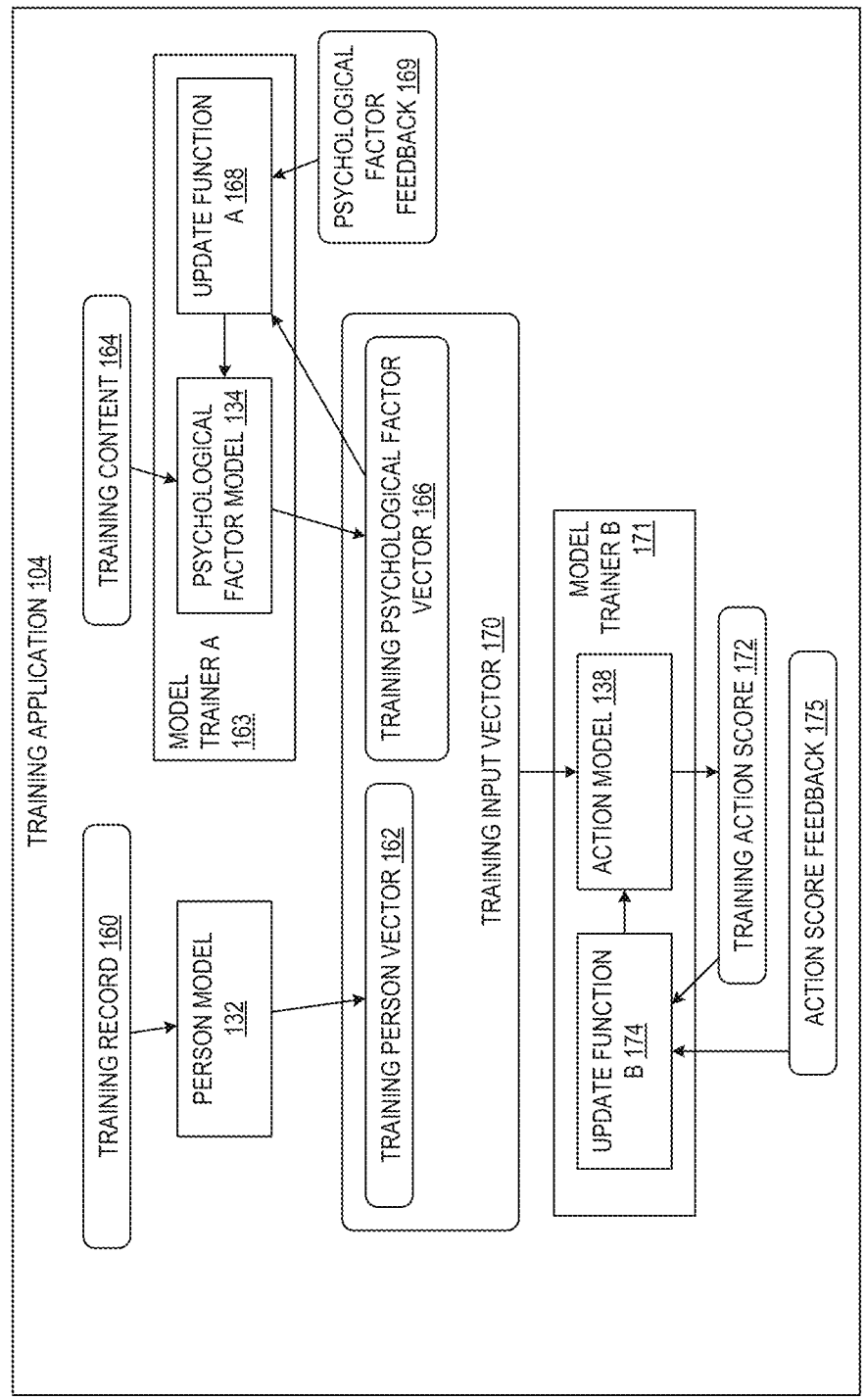
Figure 1C:
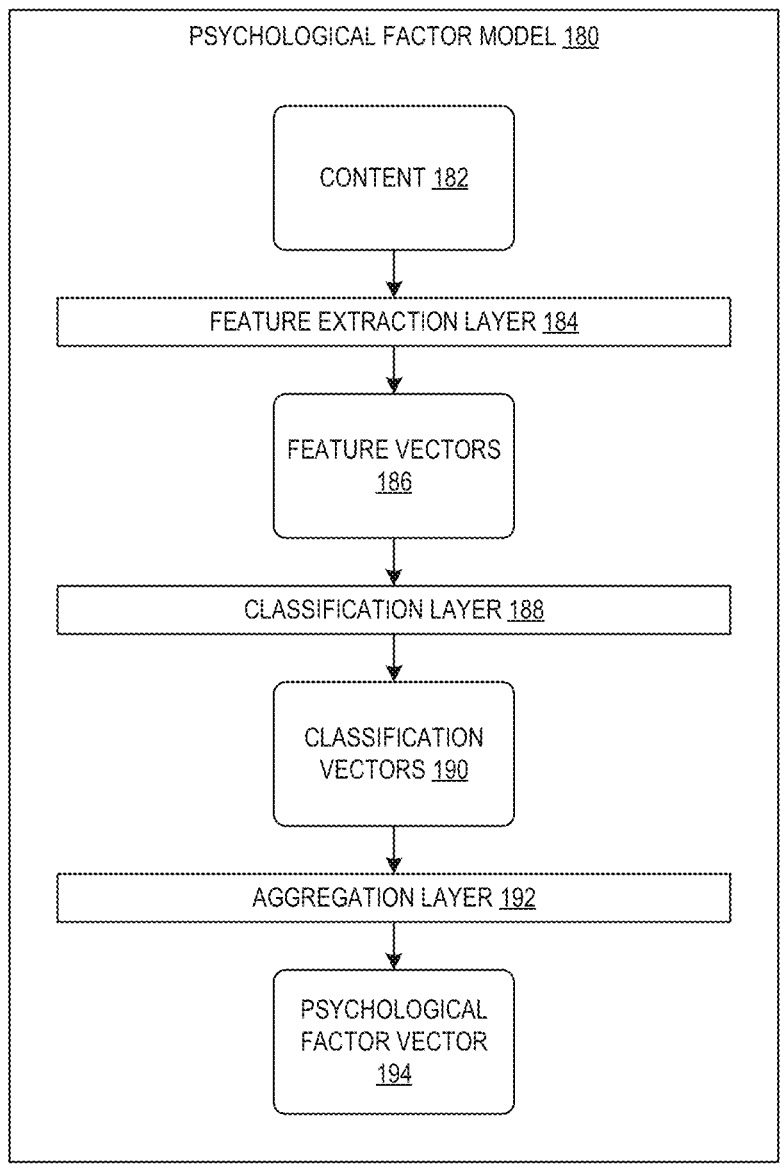
Figure 1D:
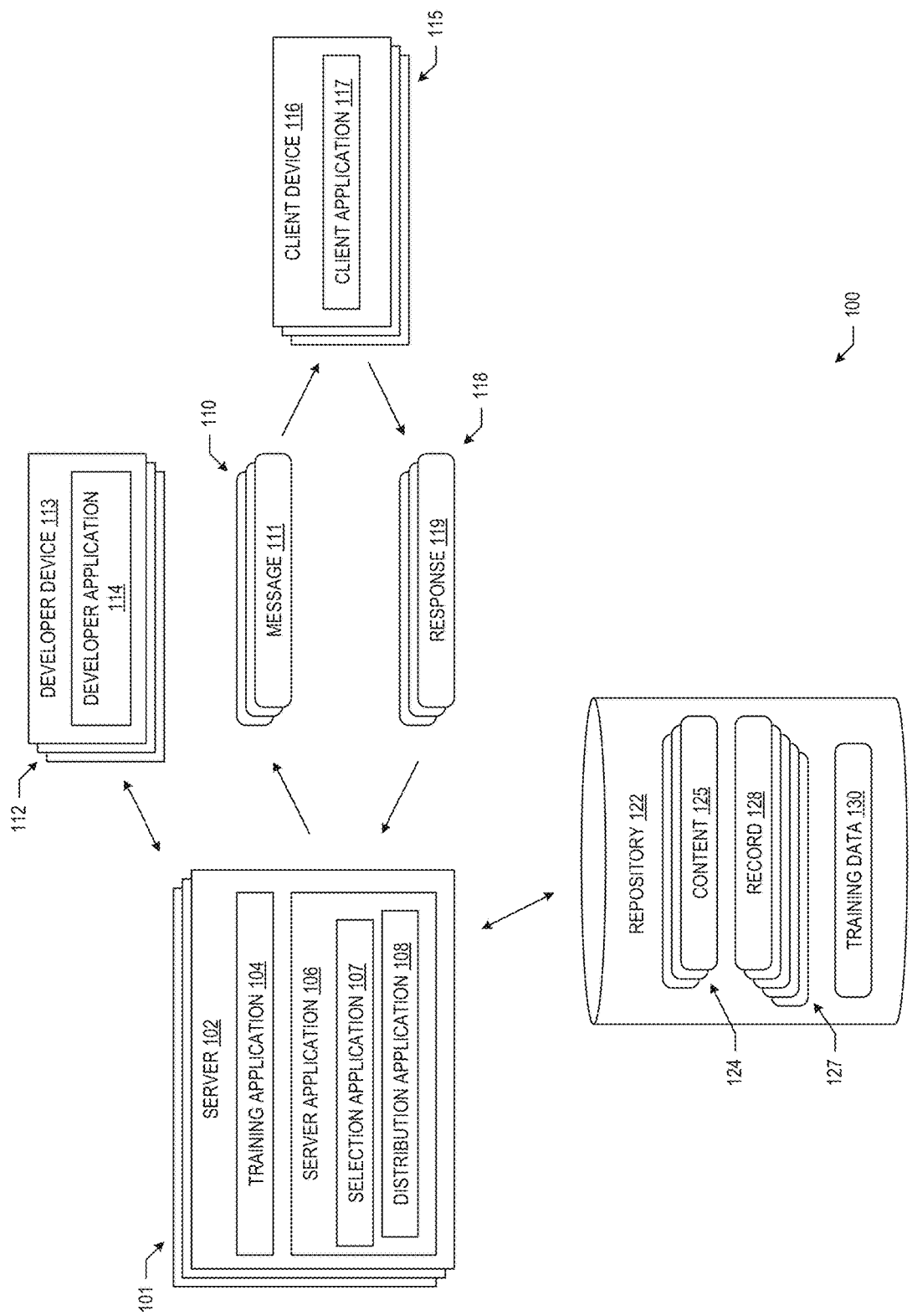

FIGS. 1A, 1B, 1C, and 1D show diagrams of embodiments that are in accordance with the disclosure. FIG. 1A shows the selection application (107) that selects content based on psychological factors. FIG. 1B shows the training application (104) that trains machine learning models. FIG. 1C shows the psychological factor model (180) that identifies psychological factors in content. FIG. 1D shows the system (100) that selects and distributes content based on psychological factors. The embodiments of FIGS. 1A, 1B, 1C, and 1D may be combined and may include or be included within the features and embodiments described in the other figures of the application. The features and elements of FIGS. 1A, 1B, 1C, and 1D are, individually and as a combination, improvements to machine learning technology and computing systems. The various elements, systems, and components shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Turning to FIG. 1A, the selection application (107) is a program that selects the content (124) that will be distributed to persons (users), represented by the records (127), based on psychological factors within the content (124) and estimated user responsiveness to psychological factors. The selection application (107) includes the person model (132), the psychological factor model (134), the action model (138), and the selector (147). The selection application and models may, individually or together, take into account user history of seeing various psychological factors or prior messages.

The content (124) is a collection of media that includes the content (125). The content (125) may be a single piece of media or a composition of multiple pieces. For example, the content (125) may be an image, an email message (with a composition of text, images, images and animation), a web page, a text message, a voice message, etc. The content (125) is content that has been developed to be distributed to users.

The records (127), including the record (128), include data and information about persons (users) to which the content (124) will be distributed. The data and information in the records (127) may include contact information, location information, identity information, psychographic information, demographic information, response information, transaction information, etc.

The contact information in the records (127) includes data that may be used to contact a person. For example, the contact information may include a name, telephone number, social media handle, physical address, etc.

The location information in the records (127) includes data that may identify a location of the person. For example, location information for a person may include a mailing address, a physical location, an internet protocol (IP) address, satellite positioning coordinates, etc.

The identity information in the records (127) may include personally identifying information of the person. For example, the identity information for a person may include a date of birth, a government identification number, etc.

The psychographic information in the records (127) includes data that describes the traits of people on psychographic attributes that describe a person's typical or likely behavior and interests. The psychographic information may include data that identifies, for a given person, activities, interests, opinions, attitudes, values, behaviors, etc. The psychographic information may be categorical (uses a credit card), ordinal (rank in household), or continuously valued (annual spend on theater tickets). The psychographic information may be obtained by responses to a marketing survey, elicited from personal behavior, purchased from information vendors, or provided from business systems.

The demographic information in the records (127) includes data that describes individual characteristics of a person that may be more innate and characterize a person somewhat independently of their behavioral choices and interests. For example, the demographic information may include data that identifies the education, nationality, religion, ethnicity, place of origin, current domicile, familial status, marital status, prior marital status, sex, gender, income, wealth, etc., of the persons represented by the records (127). Demographic information may be categorical (marital status), ordinal (highest level of education attained), or continuous valued (current estimated income).

The response information in the records (127) includes data that identifies previous responses of users to historical content designed to elicit specific actions. The historical content is content that was previously developed and presented to the users. The response information may identify the actions taken by the users in response to being presented with the historical content. For example, in response to receiving an email, a user may unsubscribe, click a link, forward to a friend, interact with a smart home device, go to a website, call a phone number, use a voice response system, etc., which may be stored as categorical data for how the user responded to the historical content, how long it took the user to respond to the content, and the value of the response to the content.

Transaction information may include information about prior interactions of a user with a business, business operations group, business partner, service provider, etc. Transaction information can contain information about what the nature of the user's relationship with the business is such as tenure with the business, subscriptions in use, use of the business's products, use of the business's services (e.g., delivery or pick-up), level of services used (e.g., a diamond plan or a bronze plan), complaints, reviews, etc. For example, a record may record that a user bought a top-end electric guitar with a 10-year support warranty and then left a 2-star review on a review website.

The person model (132) is a program that generates the person vector (133) from the record or multiple records (128). The person model (132) may condition and reformat the data from the record (128) to a form that is suitable for input to the action model (138) as part of the input vector (137). For example, categorical data may be split into multiple dimensions (e.g., one dimension for each category), numerical data may be normalized, features may be combined, etc. After being processed, the data from the record (128) may then be appended together to form the person vector (133). In one embodiment, the person model (132) selects data from the record (128) and appends that data together to form the person vector (133). In one embodiment, the person model (132) may include a machine learning algorithm (e.g., an artificial neural network) that generates an output vector, from the record (128), which forms at least a portion of the person vector (133).

The person vector (133) is a collection of data generated by the person model (132) from the record (128). In one embodiment, the person vector (133) includes psychographic data, demographic data, contact information data, etc.

The psychological factor model (134) is a program that generates the psychological factor vector (135) from the content (125). One embodiment of the psychological factor model is further described with FIG. 1C.

The psychological factor vector (135) is a collection of elements that identify the psychological factors present in the content (125). In one embodiment, the psychological factor vector (135) includes eight (8) elements for the psychological factors of "social proof", "effort aversion", "anchoring", "expert social proof", "urgency", "urgent social proof", "loss frame", and "concrete benefit".

The input vector (137) is a combination of the person vector (133) and the psychological factor vector (137) that is suitable for input to the action model (138). The input vector (137) may include additional information that identifies the outgoing communication type or other information external to the record, action record, or content record. For example, the outgoing communication type may be an email, a voice message, a text message, a web page, etc., which is identified in the input vector (137). The input vector may contain a description of the calendar period, e.g., an element indicating "holiday season", "calendar 4' quarter", or "open enrollment period"

The action model (138) is a program that generates the action score (139) from the input vector (137). In one embodiment, the action model (138) uses a machine learning algorithm to generate the action score (139). For example, the action model (138) may include an artificial neural network with multiple interconnected layers that output the action score. The layers may include recurrent neural network (RNN) layers, convolutional neural network (CNN) layers, fully connected layers, etc.

The action score (139) is the output from the action model (138). In one embodiment, the action score (139) is a value that identifies the probability that the person represented by the record (128) will take a desired action after being presented with the content (125).

In one embodiment, a specific most desired action is targeted, but there may be additional actions that are also targeted. For example, clicking a link may be the desired action of an email, but calling in via a phone number on a website may be a secondary action.

In one embodiment, the action score (139) is a value that identifies the predicted probability that the person will take a targeted action or one of a set of actions to respond to the content (125). The actions may include sending a response email, accessing a website, performing a search, posting to social media, calling a phone number, texting a message, etc.

In one embodiment, the action score (139) is a value that identifies the predicted probability that the person will take one specific action (e.g., that the person will respond by sending an email, or send a text message, or load a web page, etc.). Multiple different action models may be trained to generate predictions for different types of responses from users.

Additionally, multiple actions may be part of a set of a variety of actions. For example, actions may include calling a specific phone number, clicking a target link, returning a business reply card via mail. These different actions may be rolled into a single composite action score of "positive response".

In one embodiment, the action score (139) is a vector with a dimension for each type of response channel (email, direct mail, in-person shopping, text, web, phone, etc.). A single action model may be trained that outputs the action score (139) as a vector or multiple action models may be trained with the multiple inputs combined to form the action score (139) as a vector.

The predictions (141), including the prediction (142), are generated by the selection application (107). The prediction (142) collects the person identifier (143), the content identifier (144), and the action score (139). The person identifier (143) uniquely identifies the person represented by the record (128). The content identifier (144) uniquely identifies the content (125). In embodiment, the action score (139) is the probability that the person identified by the person identifier (143) (and represented by the record (128)) will act on the content (125) (identified by the content identifier (144)). The selection application (107) may generate the predictions (141) for each combination of the records (127) and the content (124).

In one embodiment, the predictions (141) are for scenarios that are real-time with an expected response to occur quickly (e.g., less than a minute). In another embodiment, the predictions (141) are for non-real-time scenarios in which responses are expected over a longer time frame (e.g., within a day).

The selector (147) is a program that generates the selections (149) from the predictions (141). In one embodiment, the selector (147) determines, for each person, the content with the highest action score to identify the selections (149). In another embodiment, the selector may determine the highest action score for a selection that has not already been chosen in the prior six months.

For example, selector (147) may identify a subset of the predictions (141) that have the same person identifier (143) (identify the person represented by the record (128)). When the collection of media (the content (124)) includes three individual pieces of content, three of the predictions (141) may include the person identifier (143). From the three predictions, the selector (147) identifies the prediction having the highest action score and generates a selection. In one example, the prediction (142) includes the action score (139). The action score (139) is the highest action score for the predictions that include the person identifier (143) and is used to generate the selection (150).

The selections (149), including the selection (150), include person identifiers and content identifiers that identify the content that will be distributed to the users. For example, the selection (150) includes the person identifier (143) and the content identifier (144). The person identifier (143) identifies a person (e.g., by name and address, web browser cookie, digital identity token, login credential, etc.) represented by the record (128) and the content identifier (144) identifies (e.g., by a template file name or content version code) the content (125). The selection (150) indicates that the content (125) will be delivered to the person represented by the record (128).

In one embodiment, the selector (147) may be fed predictions for an entire group of people and identify a selection having the best action score for the aggregated group of people. E.g., the action may be for a sign placed in a store or for a banner ad to a website to influence a user to buy cereal. The selection application (107) would be fed the customer list of the store and the content (124) would relate to different creatives and psychological factors that affect the sale of cereal.

Turning to FIG. 1B, the training application (104) is a program that trains the machine learning models used by the system (100) (of FIG. 1D). The training application (104) includes the model trainer A (163) and includes the model trainer B (171). The training application (104) uses the person model (132), the model trainer A (163), and the model trainer B (171) to train the psychological factor model (134) and the action model (138).

The person model (132) generates the training person vector (162) from the training record (160). The training record (160) may be part of the training data (130) (of FIG. 1D) and include data and information from the records (127). For example, the training record (160) may be a historical record for a person or user that has previously received the training content (164) from the system (100) (of FIG. 1D) and may have previously responded to the training content (164). The person model (132) operates in the same manner in the training application (104) as in the selection application (107). In one embodiment, the person model (132) includes a machine learning model that may be trained buy a model trainer of the training application (104).

The model trainer A (163) trains the psychological factor model (134). The psychological factor model (134) takes as input the training content (164) and generates the training psychological factor vector (166). The update function A (168) compares the training psychological factor vector (166) to the psychological factor feedback (169) and generates updates to the psychological factor model (134). For example, the psychological factor model (134) may include an artificial neural network and the update function A (168) may back propagate error values from a comparison of the training psychological factor vector (166) to the psychological factor feedback (169) through the layers of the artificial neural network.

The psychological factor feedback (169) may be supervised data and includes a label for the training content (164) that identifies the psychological factors in the training content (164) and includes the expected values for the training psychological factor vector (166). In one embodiment, the psychological factor feedback (169) may be unsupervised data that includes error that is back propagated from training the action model (138).

The training input vector (170) is generated from combining the training person vector (162) and the training psychological factor vector (166). The training application (104) may generate the training input vector (170) in the same manner as the selection application (107) generates the input vector (137).

The model trainer B (171) trains the action model (138). The action model (138) takes as input the training input vector (170) and generates the training action score (172). The update function B (174) compares the training action score (172) to the action score feedback (175) and generates updates to the action model (138). For example, the action model (138) may include an artificial neural network and the update function B (174) may back propagate error values from a comparison of the training action score (172) to the action score feedback (175) through the layers of the artificial neural network. The psychological factor feedback (169) may have the same number of dimensions as the training psychological factor vector (166).

The action score feedback (175) may be supervised data and includes a label for the training input vector (170) that identifies the response from the person (represented by the training record (160)) to the training content (164). The action score feedback (175) may have the same number of dimensions as the training action score (172)

Turning to FIG. 1C, the psychological factor model (180) processes data using multiple layers and is an embodiment of the psychological factor model (134). The psychological factor model (180) extracts features, classifies the features, and aggregates the classifications to form the psychological factor vector (194). The data used in the psychological factor model (180) includes the content (182), the feature vectors (186), the classification vectors (190), and the psychological factor vector (194). The layers include the feature extraction layer (184), the classification layer (188), and the aggregation layer (192).

The content (182) is creative content that is also known as "creative" and may be stored in the repository (122) (of FIG. 1D) as part of the content (124) (of FIG. 1D). The content (182) may be one of a number of types, including: images, videos, audio, text, animation, etc., and may include text, visual, and audio elements. As an example, an animation may include an animated countdown timer. The text elements may be in one or more languages and include one or more words, phrases, and slogans that are included with or embedded into the content (182). The visual elements may include one or more objects depicted within the content (182). The audible elements may include musical figures, phrases, and melodies along with speech and utterances of one or more languages. The content (182) is stored using one or more file types, including hypertext markup language (HTML) files, cascading style sheet (CSS) files, extensible markup language (XML) files, webm media files, joint photographic experts group (JPEG) files, portable network graphic (PNG) files, WAV audio files, moving picture experts group (MPEG) files, etc. In one embodiment, the content (182) is sent or streamed as a file with a web browser and is received by a server that processes the content with the psychological factor model (180).

The feature vectors (186) are the features extracted from the content (182) by the feature extraction layer (184) that correspond to the elements of the content (182). In one embodiment, the features may include one or more text, visual, and audio features that identify the text, visual, and audio elements from the content (182). In one embodiment, a feature vector is a one hot vector with a number of dimensions equal to the number of different elements that can be recognized from the content (182). In one embodiment, the features may include additional psychological elements identified from other machine learning or similar models such as emotion, feeling, "suggestive of loss" or "implies a gain."

The classification vectors (190) score characteristics from the feature vectors (186) for the elements within the content (182). In one embodiment, a classification vector includes a set of dimensions that identify multiple types of characteristics and several dimensions of interest are possible to evaluate the characteristics associated with the content (182). Characteristics may include but are not limited to goals, motivations, approaches, and psychological factors. In one embodiment, the classification vectors (190) may have eight (8) dimensions for the psychological factors (heuristics) of "social proof", "effort aversion", "anchoring", "expert social proof", "urgency", "urgent social proof", "loss frame", and "concrete benefit". Additional embodiments may use the same or different characteristics with the same or different dimensions to form the classification vectors (190).

The psychological factor vector (194) (which may also be referred to as an aggregated vector) is a score that identifies the combined characteristics of the classification vectors (190) generated from the feature vectors (186) for the content (182). In one embodiment, the psychological factor vector (194) includes the same number of dimensions as one of the classification vectors (190) and the same meaning for each dimension. As an example, the classification vectors (190) may have the same eight (8) dimensions as the classification vectors (190), as described above.

The feature extraction layer (184) is a set of programs that generate the feature vectors (186) from the content (182). In one embodiment, the feature extraction layer (184) applies one or more machine learning algorithms to the content (182). For example, the feature extraction layer (184) may include one or more neural networks (e.g., fully connected neural networks, convolutional neural networks (CNNs), recurrent neural networks (RNNs), long short term memories (LSTMs), etc.) to process the content (182) and generate the feature vectors (186). In one embodiment, the feature extraction layer (184) is a feature extraction service from a third party that is accessed using a representational state transfer (REST) application programming interface (API) to send the content (182) and receive the feature vectors (186). In one embodiment, the feature extraction service may identify elements from the content (182) with strings that are then converted to the feature vectors (186). The feature extraction layer (184) may include separate algorithms for the different types of the content (182) and the different types of elements within the content (182).

The classification layer (188) is a set of programs that score the feature vectors (186) from the content (182) to generate the classification vectors (190). In one embodiment, the classification layer (188) assigns the classification vectors (190) to the feature vectors (186) using one or more algorithms. For example, the classification vectors (190) may be assigned to the feature vectors (186) using a look up table. Additionally, one or more machine learning algorithms may be trained and used to generate the classification vectors (190) from one or more of the content (182) and the feature vectors (186).

The aggregation layer (192) of the psychological factor model (180) combines the classification vectors (190) generated in response to the content (182) to create the psychological factor vector (194). One or more numeric or machine learning algorithms may be trained and used to generate the psychological factor vector (194) from one or more of the content (182), the feature vectors (186), and the classification vectors (190). In one embodiment, the aggregation layer (192) combines the classification vectors (188) by one or more of weighting, averaging, adding, and normalizing the classification vectors (188).

Turning to FIG. 1D, the system (100) selects content based on the psychological factors in the content. The servers (101) read and write data to the repository (122), send and receive the messages (110) (which include selected content) and the responses (118) to and from the client devices (115) and may be controlled with the developer devices (112). The system (100) may be implemented using cloud computing environments with the servers (101) in accordance with the computing systems and networks described in FIGS. 4A and 4B. Content is selected with the selection application (107) and distributed with the distribution application (108).

The selection application (107) is a program that operates as part of the server application (106) on the server (102). The selection application (107) selects the content (124), which is distributed to people represented by the records (127). The selection application (107) generates predictions of the actions the people will take in response to the content (124) and may select the content (124) for each person predicted to have the highest probability of the person to take action. The selection application (107) is further described with FIG. 1A.

The distribution application (108) is a program that operates as part of the server application (106) on the server (102). The distribution application (108) distributes the content (124), selected by the selection application (107), to a person by transmitting the content (124) to the client device (115) using the messages (110) or causing content to be transmitted or displayed as physical content as through a piece of mail in a mailbox or a placement of a placard in a retail store.

The server application (106) operates on the server (102) and includes programs that select and distribute content to the client devices (115), which are operated by users using the system (100). The server application (106) uses the distribution application (108) to transmit the messages (110) to the client devices (116). The server application (106) receives the responses (118) from the client devices. The server application (106) may store information from the responses (118) to the repository (122) by updating the records (127) and the training data (130).

The server application (106) may use the selection application (107) to select the content (125) to be sent to the person represented by the record (128). The server application (106) uses the distribution application (108) to generate and send the message (111) to the client device (116), which corresponds to the person represented by the record (128). The server application (106) then receives, from the client device (116), the response (119), which is an action taken by the person in response to the content (125) in the message (111).

In one embodiment, the content (125) is an email with text and images sent as the message (111) to the client device (116) and presented by the client application (117). In one embodiment, the person responds by clicking on a link in the email, which generates the response (119), which a request for a web page to be viewed on the client device (116).

The messages (110), including the message (111), are messages sent from the servers (101) to the client devices (115). For example, the message (111) includes the content (125), which was selected by the selection application (107). The messages (110) may be emails, text messages, voice messages, web pages, etc.

In one embodiment, the message (110) may be printed and mailed to person. In response to the printed form of the message (110), the person may access the client device (116) to view a website or call a phone number on the printed form of the message (110).

The responses (118), including the response (119), are responses sent from the client devices (115) to the servers (101). For example, the response (119) indicates an action taken by the person operating the client device (116) in response to being presented the content (125) from the message (111). The responses (118) may be emails, text messages, voice messages, web page requests, etc.

The training application (104) operates on the server (102) and includes programs that train the machine learning models used by the system (100). The machine learning models include models to identify psychological factors in the content (124). The machine learning models also include models to predict the actions a person will take in response to the content (124) based on the psychological factors in the content (124). The training application (104) is further described with FIG. 1B.

Figure 4A:
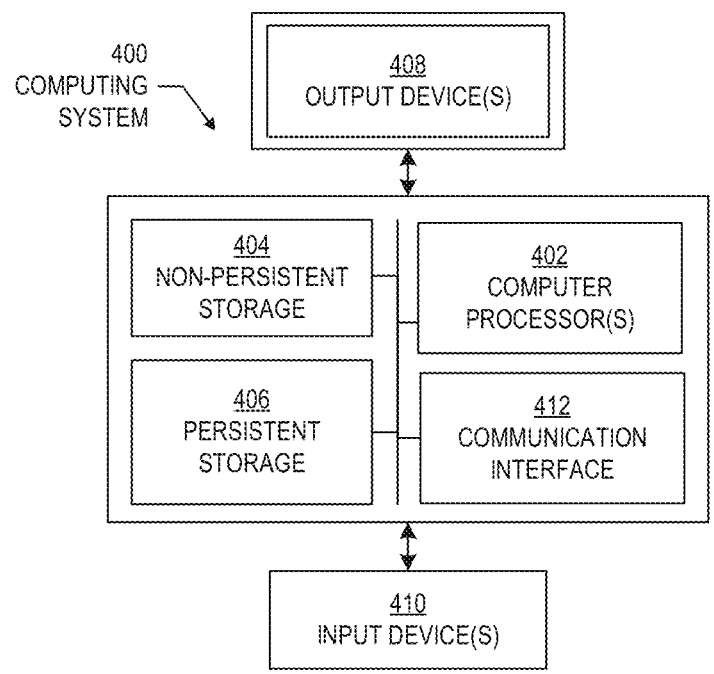
FIG. 4A and FIG. 4B show computing systems in accordance with disclosed embodiments.
Figure 4B:
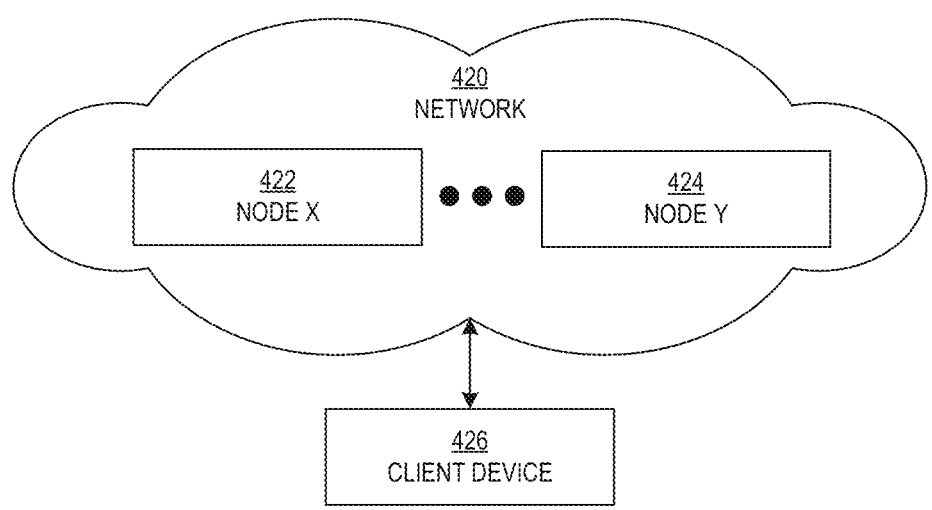

The client devices (115), including the client device (116), are embodiments of the computing system (400) and the nodes (422) and (424) of FIG. 4A and FIG. 4B. In one embodiment, the client device (116) is a desktop personal computer (PC), a smartphone, a tablet, etc. The client device (116) includes the client application (117).

The client application (117), operating on the client device (116), interacts with the server (102) to receive the message (111), display the content (125), and generate and transmit the response (119). The client application (117) may include multiple interfaces (e.g., graphical user interfaces) for interacting with the system (100). A person may operate the client application (117) to display and interact with the messages (110) and content (124). In one embodiment, the client application (117) may be a web browser that accesses the applications running on the server (101) using web pages hosted by the server (101).

The developer device (113) is an embodiment of the computing system (400) and the nodes (422) and (424) of FIG. 4A and FIG. 4B. In one embodiment, the developer device (113) is a desktop personal computer (PC). The developer device (113) includes the developer application (114).

The developer application (114), operating on the developer device (113), interacts with the server (102) to develop the content (124) and control the training of the machine learning models of the system (100). In one embodiment, the developer application (114) may be a web browser that accesses the applications running on the server (101) using web pages hosted by the server (101).

The developer application (114) and the client application (117) may be web browsers that access the server application (106) and the training application (104) using web pages hosted by the servers (101). The developer application (114) and the client application (117) may additionally be web services that communicate with the server application (106) and the training application (104) using representational state transfer application programming interfaces (RESTful APIs). Although FIG. 1A shows a client server architecture, one or more parts of the training application (104) and the server application (106) may be local applications on the developer device (113) and the user device (114) without departing from the scope of the disclosure.

The repository (122) is a computing system that may include multiple computing devices in accordance with the computing system (400) and the nodes (422) and (424) described below in FIGS. 4A and 4B. The repository (122) may be hosted by a cloud services provider. The cloud services provider may provide hosting, virtualization, and data storage services as well as other cloud services and to operate and control the data, programs, and applications that store and retrieve data from the repository (122). The data in the repository (122) may include the content (124) (described with FIG. 1A), the records (127) (described with FIG. 1A), and the training data (130). The repository (122) may include a data store (also referred to as a creative data store) that stores the content (124).

The training data (130) is the training data used to train the machine learning models used by the system. The training data (130) may include historical content and historical records. The historical content is content that may have been previously presented to users. The historical records represent people that have used (and may still be using) the system and have been presented with historical content. The training data (130) may also include the intermediate training data used to train the machine learning models. For example, the intermediate training data may include (from FIG. 1B) the training record (160), the training person vector (162), the training content (164), the training psychological factor vector (166), the psychological factor feedback (169), the training input vector (170), the training action score (172), and the action score feedback (175). The system (100) may record the interactions between the servers and client devices in the training data (130), which includes the actions that users have taken in response to the content presented to the users by the system (100).

The system (100) may also store the intermediate data generated with the selection application (107) in the repository (122). The intermediate data generated with the selection application (107) includes the person vector (133), the psychological factor vector (135), the input vector (137), the action score (139), the predictions (141), and the selections (149).

Figure 2:
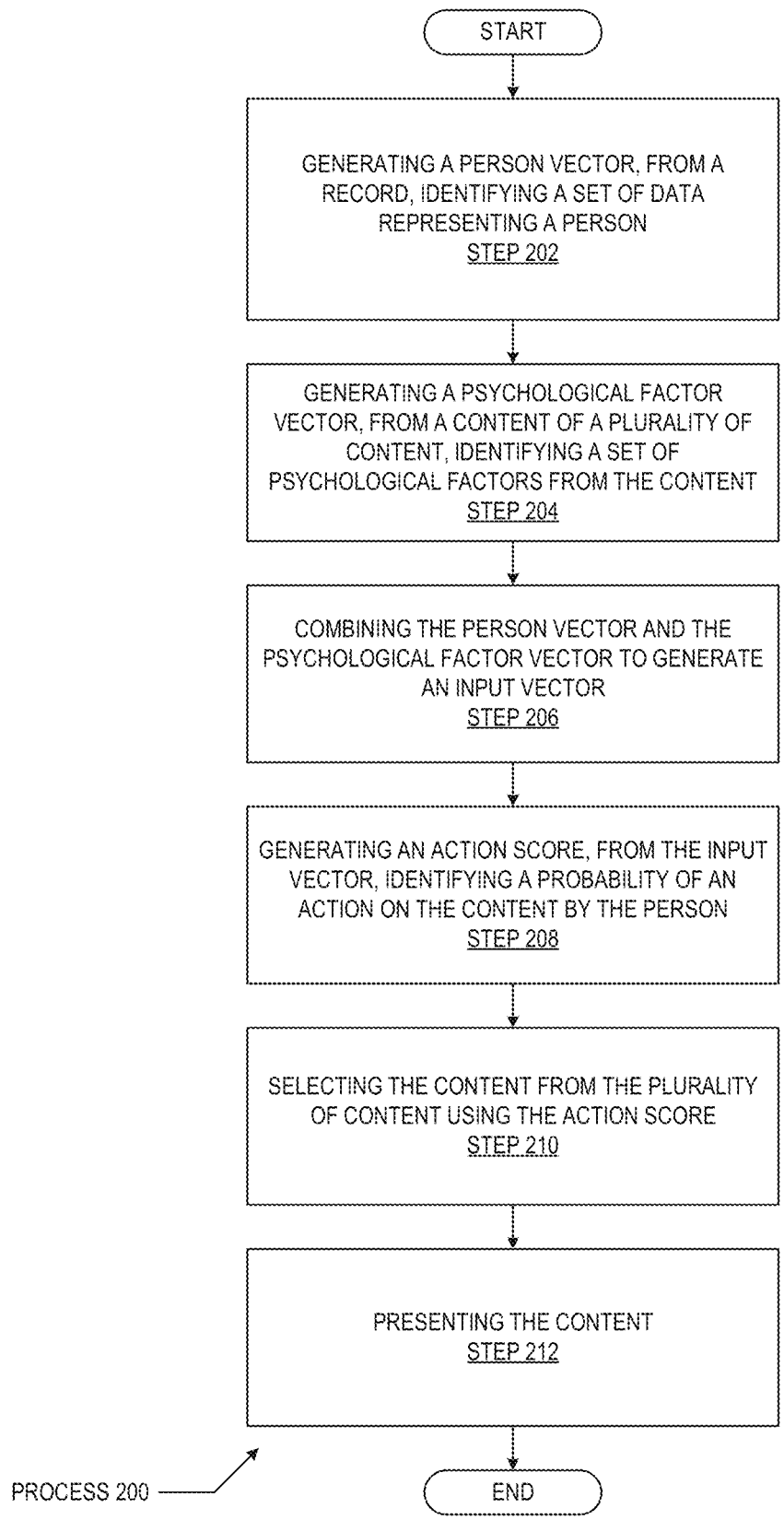
FIG. 2 shows a flowchart in accordance with disclosed embodiments.

FIG. 2 shows a flowchart of the process (200) in accordance with one or more embodiments of the disclosure for selecting content based on psychological factors within the content. Embodiments of FIG. 2 may be combined, and may include or be included within, the features and embodiments described in the other figures of the application. The features of FIG. 2 are, individually and as an ordered combination, improvements to machine learning models and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) selects and distributes content based on the psychological factors in the content to increase interaction with the system by users of the system. In one embodiment, the process (200) may be performed by a server application executing on a server.

At Step 202, a person vector is generated from a record. The record may include an interaction history of the person with the system, which may include a browser history, a list of phone calls, combinations thereof, etc. The person vector identifies a set of data representing a person. The data in the person vector may be taken direction from the record or processed from the record. For example, a zip code may be taken directly from the record. The ethnicity of the customer may be processed from a single categorical value into binary values for a number of dimensions equal to the number of ethnicities used by the system. In addition to the interaction history, the data in the records may include contact information, location information, identity information, psychographic information, demographic information, response information, etc. Processing the records to generate the person vectors may use statistical algorithms, selection algorithms, neural network algorithms, etc.

In one embodiment, a person model is trained to generate person vectors using training records for multiple persons. The person model may include statistical algorithms, selection algorithms, neural network algorithms, etc., which may be incrementally updated using error, feedback, back propagation, etc.

At Step 204, a psychological factor vector is generated from content. The psychological factor vector identifies a set of psychological factors from the content. The psychological factor vector may be generated with a psychological factor model. The psychological factor model is a machine learning model and may include a logistic regression model, a neural network model, a statistical model, etc.

In one embodiment, the psychological factor vector includes a plurality of dimensions. Each dimension may represent a psychological factor that is identified in the content. In one embodiment, the psychological factors may include the psychological factors labeled as "social proof", "effort aversion", "anchoring", "expert social proof", "urgency", "urgent social proof", "loss frame", and "concrete benefit".

In one embodiment, a psychological factor model is trained, using training content, to generate psychological factor vectors. The psychological factor model may be a machine learning model that may use logistic regression models or neural network models.

The training may happen in real time or batch mode. In real time training, the system evaluates and re-trains the model in response to current actions happening. In batch mode, data is aggregated, processed, and then a new set of recommendations are emitted that correspond to the people and communications channels used by the system.

In one embodiment, the psychological factor model is trained by generating training psychological factor vectors and updating the psychological factor model. The training psychological factor vectors are generated from training content by the psychological factor model. The psychological factor model is updated using the training psychological factor vectors and psychological factor feedback.

At Step 206, the person vectors and psychological factor vectors are combined to generate an input vector. Combining the person vectors and psychological factor vectors into the input vectors may be performed by concatenating or appending the person vectors to the psychological factor vectors. Additionally, additional data may be included with the input vector. The additional data may identify the communication type of the content used to generate the psychological factor vectors and may identify the platform used by the person to view the content. The communication type may be mail, email, phone, text, social media, etc. The platforms include mobile devices, desktop computers, laptop computers, etc.

At Step 208, action scores are generated from input vectors. An action score correlates to and may identify a probability of an action on the content by the user. Actions include responding with an email, text message, voice message, etc., and include requesting a web page, calling a phone number, etc. The action score may be generated with an action model that uses machine learning algorithms.

In one embodiment, an action model is trained to generate a training action score using training input vectors generated from training records and training content. The action model may be a machine learning model that includes an artificial neural network model. The action model may be trained in a real-time mode or in a batch mode.

In one embodiment, an action model is trained by generating training action scores and updating the action model. Training action scores are generated from training input vectors. The action model is updated using the training action scores and action score feedback.

At Step 210, content is selected using the action scores. For each person, the content with the highest action score may be selected to be distributed to the person by the system.

At Step 212, the content is presented. The content may be presented by transmitting the content in a message to a client device. The client device includes a client application that displays the content to the person using the client device.

In one embodiment, in response to presenting the content, a response triggered by the action is received. The action may include sending an email, accessing a web page, initiating a voice conversation, mailing a response, purchasing a good or service, sending a text message, etc.

Figure 3A:
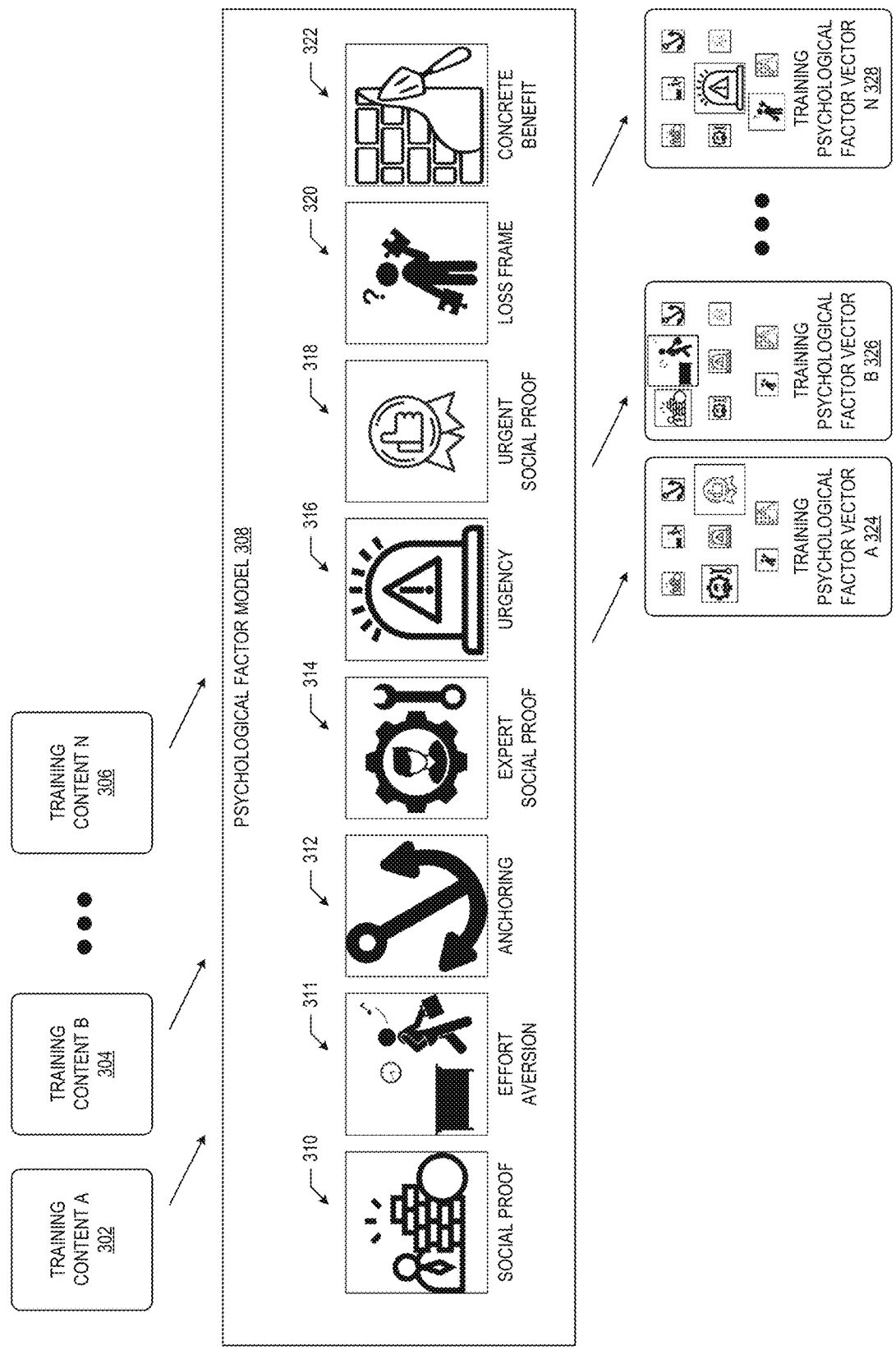
FIG. 3A, FIG. 3B, and FIG. 3C show examples using dataflow diagrams in accordance with disclosed embodiments.
Figure 3B:
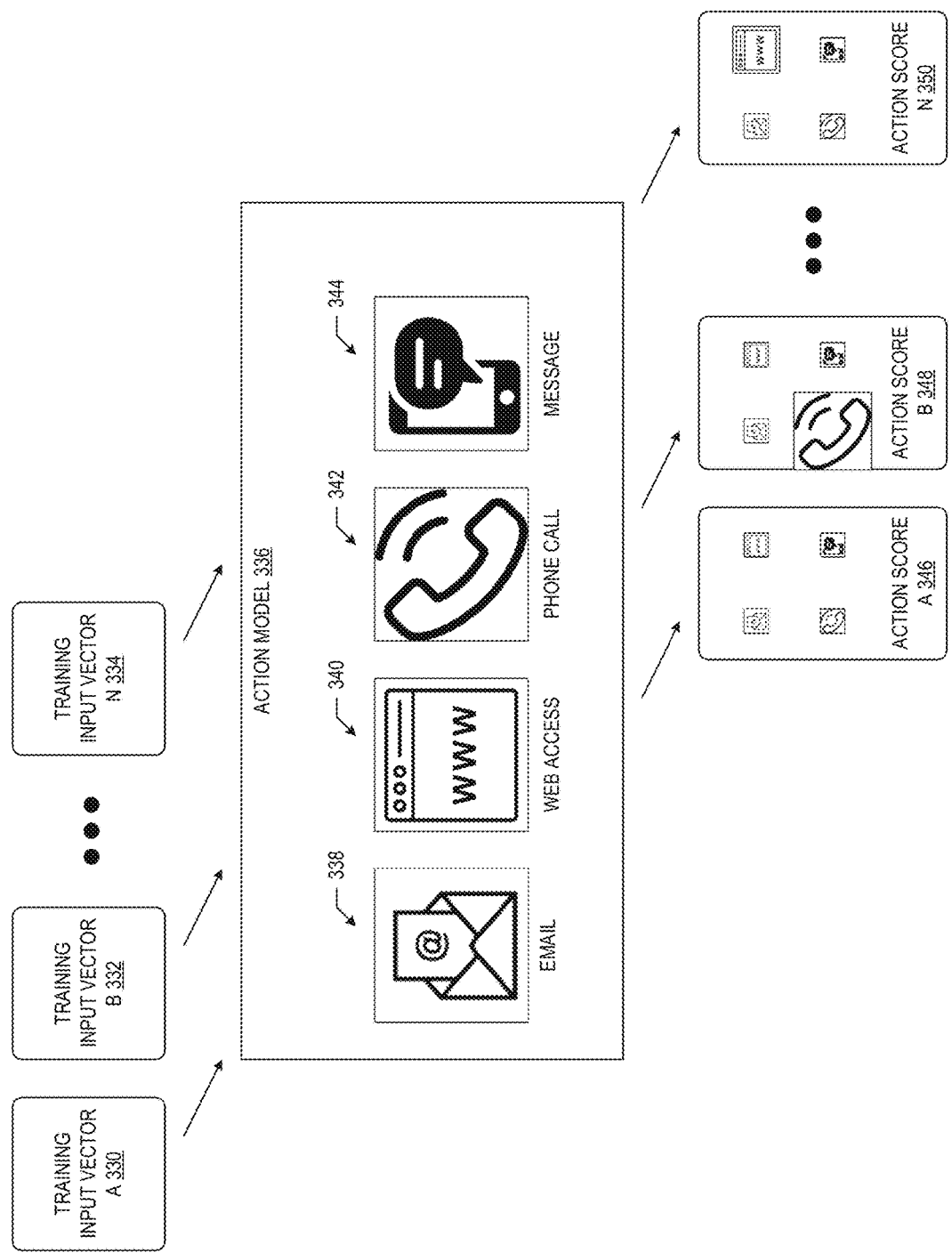
Figure 3C:
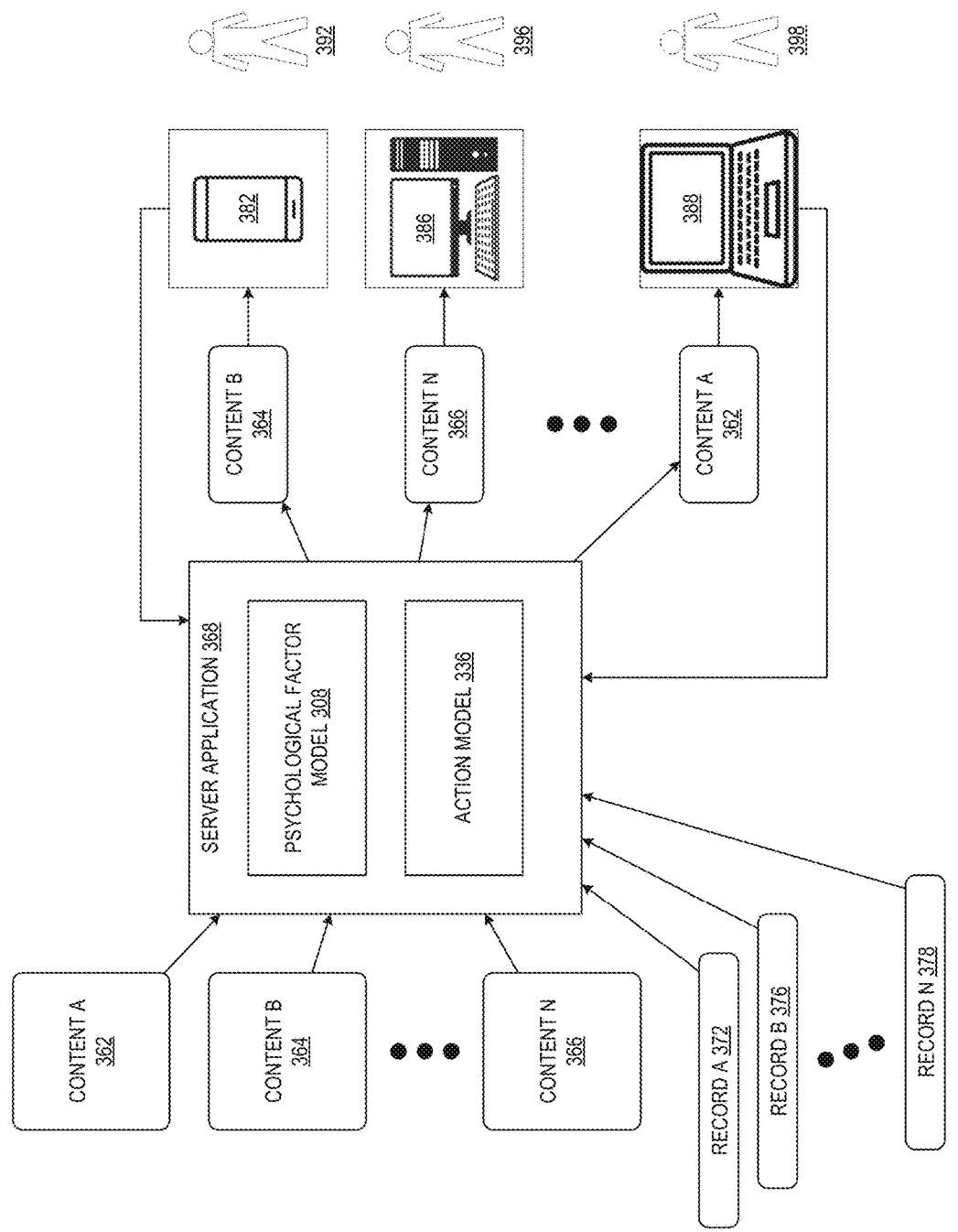

FIGS. 3A, 3B, and 3C show examples of systems and sequences that secure hash chains in accordance with the disclosure. FIG. 3A shows a psychological factor model that is training. FIG. 3B shows an action model that is training. FIG. 3C shows the psychological factor and action models used in a system. The embodiments shown in FIGS. 3A, 3B, and 3C may be combined and may include or be included within the features and embodiments described in the other figures of the application. The features and elements of FIGS. 3A, 3B, and 3C are, individually and as a combination, improvements to machine learning technology and computing systems. The various features, elements, widgets, components, and interfaces shown in FIGS. 3A, 3B, and 3C may be omitted, repeated, combined, and/or altered as shown. Accordingly, the scope of the present disclosure should not be considered limited to the specific arrangements shown in FIGS. 3A, 3B, and 3C.

Turning to FIG. 3A, the psychological factor model (308) is trained to generate the training psychological factor vectors A (324), B (326), through N (328) from the training content A (302), B (304), through N (306). The psychological factor model (308) is trained to identify the psychological factors, represented by the psychological factor icons (310) through (322), in the training content A (302) through N (306).

The psychological factor icon (310) represents the psychological factor (heuristic) labeled as "social proof". The psychological factor icon (311) represents the psychological factor (heuristic) labeled as "effort aversion". The psychological factor icon (312) represents the psychological factor labeled as "anchoring". The psychological factor icon (314) represents the psychological factor labeled as "expert social proof". The psychological factor icon (316) represents the psychological factor labeled as "urgency". The psychological factor icon (318) represents the psychological factor labeled as "urgent social proof". The psychological factor icon (320) represents the psychological factor labeled as "loss frame". The psychological factor icon (322) represents the psychological factor labeled as "concrete benefit". The psychological factor model (308) with the psychological factor icons (310) through (322) may be displayed on a developer device to differentiate the psychological factor model (308) from other psychological factor models.

The training psychological factor vectors A (324) through N (328) store the psychological factors as a eight (8) element vector. Each psychological factor in a vector may be stored as a value between 0 and 1 in the training psychological factor vectors A (324) through N (328). Psychological factors with larger values are represented by an icon with a larger size. The largest icon may have a value equal to about 1 and the smallest icon may have a value equal to about 0. The training psychological factor vectors A (324) through N (328) may be displayed with the psychological factor icons on a developer device.

The largest icon of the training psychological factor vector A (324) is for the psychological factor (heuristic) labeled as "urgent social proof", which indicates that the psychological factor labeled as "urgent social proof" has the highest value or strongest impact in the training content A (302). The second largest icon of the training psychological factor vector A (324) is for the psychological factor labeled as "expert social proof", which indicates that the psychological factor labeled as "expert social proof" has the second highest value or impact in the training content A (302). The remaining icons have a similar size that is smaller than the psychological factors labeled as "urgent social proof" and "expert social proof", which indicates that the remaining psychological factors are not as strongly present in the training content A (302).

The values in the training psychological factor vector A (324) indicate that the training content A (302) should be presented to people that are primarily responsive to the psychological factor labeled as "urgent social proof" and may also be responsive to the psychological factor labeled as "expert social proof". The values in the training psychological factor vector B (326) indicate that the training content B (304) should be presented to people that are primarily responsive to the psychological factor labeled as "effort aversion" and may also be responsive to the psychological factor labeled as "social proof".

After generating the training psychological factor vectors A (324) through N (328), the psychological factor model (308) may be updated using backpropagation to adjust weights and parameters of the psychological factor model (308). Adjustment of the weights and parameters may be based on a comparison of the training psychological factor vectors A (324) through N (328) to psychological factor feedback or labels for the training content A (302) through N (306).

Turning to FIG. 3B, the action model (336) is trained to generate the action scores A (346), B (348), through N (350) from the training input vectors A (330), B (332), through N (334). The action model (336) is trained to generate probabilities that actions (represented by the action icons (338) through (344)) will be taken by a person in response to content. The person for the training input vector A (330) may be represented by a training person vector generated from a training record. The content for the training input vector A (330) may be represented by a training psychological factor vector generated from training content.

The action icon (338) represents the action of sending an email. The action icon (340) represents the action of requesting a web page. The action icon (342) represents the action of placing a phone call. The action icon (344) represents the action of sending a text message. The action model (336) with the action icons (338) through (344) may be displayed on a developer device to differentiate the action model (336) from other action models.

The action scores A (346) through N (350) may use a four (4) element vector to store values for the elements that represent the actions. Each value may be stored as a number between 0 and 1 in the vectors of action scores A (346) through N (350). Actions with larger values are represented by an icon with a larger size. The largest icon may have a value equal to about 1 and the smallest icon may have a value equal to about 0. The action scores A (346) through N (350) may be displayed with the action icons on a developer device.

The largest icon of the action score A (348) is for the action labeled as "phone call", which indicates that the person of the training input vector B (332) is most likely to place a call in response to the content represented in the training input vector B (332). The largest icon in the action score N (350) (for "web access") is smaller than the largest icon for the action score B (348) indicating that the person of the training input vector N (334) has a lower probability of taking action in response to the content of the training input vector N (334). The icons of the action score A (346) may indicate that the person represented by the training input vector A (330) has a substantially zero probability of taking action on the content represented in the training input vector A (330).

After generating the action scores A (346) through N (350), the action model (336) may be updated using backpropagation to adjust weights and parameters of the action model (336). Adjustment of the weights and parameters may be based on a comparison of the action scores A (346) through N (350) to feedback or labels for the training input vector A (330) through N (334) that identify the historical response of the people (represented in the training input vectors A (330) through N (334)) to the content (represented in the training input vectors A (330) through N (334)).

Turning to FIG. 3C, the server application (368) selects and distributes content to people. The content A (362), B (364), through N (366) is content that will be distributed to the people (392), (396), through (398). Each one of content A (362) through N (366) may be embedded with different psychological factors. Each person (392) through (398) may be triggered to take action based on different psychological factors. The server application (368) uses the psychological factor model (308) and the action model (336) to identify which of the content A (362) through N (366) is distributed to which of the people (392) through (398).

The server application (368) receives the content A (362), B (364), through N (366) and processes the content A (362), B (364), through N (366) with the psychological factor model (308) and the action model (336).

The server application (368) receives the records A (372), B (376), through N (378). The records A (372), B (376), through N (378) represent the customers (392), (396), through (398). The records A (372) through N (378) contain data and information about the people (392) through (398), including contact information, location information, identity information, psychographic information, demographic information, response information, etc. The server application (368) generates person vectors from the records A (372) through N (378).

The psychological factor model (308) (trained as described with FIG. 3A) receives the content A (362) through N (366) as input. The psychological factor model (308) generates psychological factor vectors as output, from the content A (362) through N (366). The psychological factor vectors identify the psychological factors present within the content A (362) through N (366).

After the person vectors and psychological factor vectors are generated, the server application generates input vectors. The input vectors include the data from the person vectors (generated from the records A (372) through N (378)) and the psychological factor vectors (generated from the content A (362) through N (366)).

The action model (336) receives the input vectors as input and generates action vectors as output. The action vectors include values that predict the probabilities that the people (392) through (398) will take action on the content A (362) through N (366).

The server application (368) uses the action vectors to select the content distributed to the people (392) through (398). The content B (364) is selected to be sent to the client device (382) of the person (392). The content N (366) is selected to be sent to the client device (386) of the person (396). The content A (362) is selected to be sent to the client device (388) of the person (398).

The client devices (382), (386), and (388) respectively receive the content B (364), N (366), and A (362). The client devices (382), (386), and (388) each include client applications that display the respective content.

In response to the content A (362), the person (398) takes action by sending a response to the server application (368). For example, the content A (362) may be a web page sent to, and displayed by, the client device (laptop computer) (388). In response, the person (398) may take action by clicking on a link in the web page to request additional information.

In response to the content B (364), the person (392) takes action by sending a response to the server application (368). For example, the content B (364) may be a text message sent to, and displayed on, the client device (mobile phone) (382). In response, the person (392) may take action by calling a number from the text message.

In response to the content N (366), the person (392) does not take action. For example, the content N (366) may be an email sent to, and displayed on, the client device (computer) (386). In response, the person (392) may take no action.

Using the psychological factor model (308) and the action model (336), the system increases the responses from people taking action. As an example, if the content N (366) were sent to each of the people (392) through (398), none of the people may have taken action. By sending the content B (364) to the person (392) and sending the content A (362) to the person (398), the system increases the number of responses received from the people (392) through (398).

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be a physical integrated circuit, logical integrated circuit, or computing abstraction for processing instructions. For example, the computer processor(s) (402) may be one or more physical cores, virtual cores, or micro-cores of a processor or the processor(s) may be a virtual computer like a cloud computing "serverless" computation service. The computing system (400) may also include one or more input device(s) (410), such as a touchscreen, a keyboard, a mouse, a microphone, a touchpad, an electronic pen, or any other type of input device.

The communication interface (412) may be physical or virtual and may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), virtual reality environment, a touchscreen, a cathode ray tube (CRT) monitor, a projector, commercial offset printer, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms including virtual services that may emulate or abstract all or part of the essential features or forms of physical embodiments of these systems.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, Quick Response (QR) code, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

As an example of the network (420) and although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, an application programming interface (API) call, a signal, a socket, a message queue, a database entry, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept or queue the connection request. The server process may accept the connection request to establish a communication channel with the client process. The server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model. The user interface may also be a virtual reality user interface.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    generating a person vector, from a record, identifying a set of data representing a person;
    generating, by a neural network model, a psychological factor vector, from a content of a plurality of content, identifying a set of psychological factors from the content, wherein the psychological factor vector is generated by
        processing the content with a feature layer of the neural network model to form a plurality of feature vectors,
        processing the plurality of feature vectors with a classification layer of the neural network model to form a plurality of classification vectors; and
        processing the plurality of classification vectors with an aggregation layer of the neural network model to form the psychological factor vector;
    combining the person vector and the psychological factor vector to generate an input vector;
    generating an action score, from the input vector, identifying a probability of an action on the content by the person;
    selecting the content from the plurality of content using the action score; and
    presenting the content.

2. The method of claim 1, further comprising:
    generating the psychological factor vector,
        wherein the psychological factor vector includes a plurality of dimensions, and
        wherein each dimension of the plurality of dimensions represents a psychological factor of the set of psychological factors.

3. The method of claim 1,
    wherein each psychological factor of the set of psychological factors is one of a plurality of psychological factors, and
    wherein the plurality of psychological factors comprises "social proof", "effort aversion", "anchoring", "expert social proof", "urgency", "urgent social proof", "loss frame", and "concrete benefit".

4. The method of claim 1, further comprising:
    training a psychological factor model, using training content, to generate the psychological factor vector, wherein the psychological factor model is a machine learning model comprising one or more of a logistic regression model and the neural network model.

5. The method of claim 1, further comprising:
    training a psychological factor model by:
        generating training psychological factor vectors from training content, and
        updating the psychological factor model using the training psychological factor vectors and psychological factor feedback.

6. The method of claim 1, further comprising:
    training an action model, using training input vectors generated from training records and training content, to generate the action score, wherein the action model is a machine learning model comprising the neural network model.

7. The method of claim 1, further comprising:
    training an action model by:
        generating training action scores from training input vectors, and
        updating the action model using the training action scores and action score feedback.

8. The method of claim 1, further comprising:
    training a person model, using training records for a plurality of persons, to generate the person vector.

9. The method of claim 1, further comprising:
    receiving, in response to presenting the content, a response triggered by the action.

10. The method of claim 1, wherein the action comprises one of sending an email, accessing a web page, initiating a voice conversation, and sending a text message.

11. A system comprising:
    a server comprising one or more processors and one or more memories; and
    an application, executing on one or more processors of the server, configured for:
        generating a person vector, from a record, identifying a set of data representing a person;
        generating, by a neural network model, a psychological factor vector, from a content of a plurality of content, identifying a set of psychological factors from the content, wherein the psychological factor vector is generated by
            processing the content with a feature layer of the neural network model to form a plurality of feature vectors,
            processing the plurality of feature vectors with a classification layer of the neural network model to form a plurality of classification vectors; and
            processing the plurality of classification vectors with an aggregation layer of the neural network model to form the psychological factor vector;
        combining the person vector and the psychological factor vector to generate an input vector;
        generating an action score, from the input vector, identifying a probability of an action on the content by the person;
        selecting the content from the plurality of content using the action score; and
        presenting the content.

12. The system of claim 11, wherein the application is further configured for:
    generating the psychological factor vector,
        wherein the psychological factor vector includes a plurality of dimensions, and
        wherein each dimension of the plurality of dimensions represents a psychological factor of the set of psychological factors.

13. The system of claim 11,
    wherein each psychological factor of the set of psychological factors is one of a plurality of psychological factors, and
    wherein the plurality of psychological factors comprises "social proof", "effort aversion", "anchoring", "expert social proof", "urgency", "urgent social proof", "loss frame", and "concrete benefit".

14. The system of claim 11, wherein the application is further configured for:
    training a psychological factor model, using training content, to generate the psychological factor vector, wherein the psychological factor model is a machine learning model comprising one or more of a logistic regression model and the neural network model.

15. The system of claim 11, wherein the application is further configured for:
   training a psychological factor model by:
      generating training psychological factor vectors from training content, and
      updating the psychological factor model using the training psychological factor vectors and psychological factor feedback.

16. The system of claim 11, wherein the application is further configured for:
   training an action model, using training input vectors generated from training records and training content, to generate the action score, wherein the action model is a machine learning model comprising the neural network model.

17. The system of claim 11, wherein the application is further configured for:
   training an action model by:
      generating training action scores from training input vectors, and
      updating the action model using the training action scores and action score feedback.

18. The system of claim 11, wherein the application is further configured for:
   training a person model, using training records for a plurality of persons, to generate the person vector.

19. A method comprising:
   generating a training person vector, from a training record, identifying a set of data for a person;
   generating, by a neural network model, a training psychological factor vector, from a training content of a plurality of training content, identifying a set of psychological factors from the training content, wherein the training psychological factor vector is generated by
      processing the content with a feature layer of the neural network model to form a plurality of feature vectors,
      processing the plurality of feature vectors with a classification layer of the neural network model to form a plurality of classification vectors; and
      processing the plurality of classification vectors with an aggregation layer of the neural network model to form the training psychological factor vector;
   updating a psychological factor model using the training psychological factor vector and psychological factor feedback to train the psychological factor model;
   combining the training person vector and the training psychological factor vector to generate a training input vector;
   generating a training action score, from the training input vector, identifying a probability of an action on the training content by the person; and
   updating an action model using the training action score and action score feedback to train the action model.

20. The method of claim 19,
   wherein the psychological factor model is a machine learning model comprising one or more of a logistic regression model and the neural network model, and
   wherein the action model is a machine learning model comprising the neural network model.

* * * * *